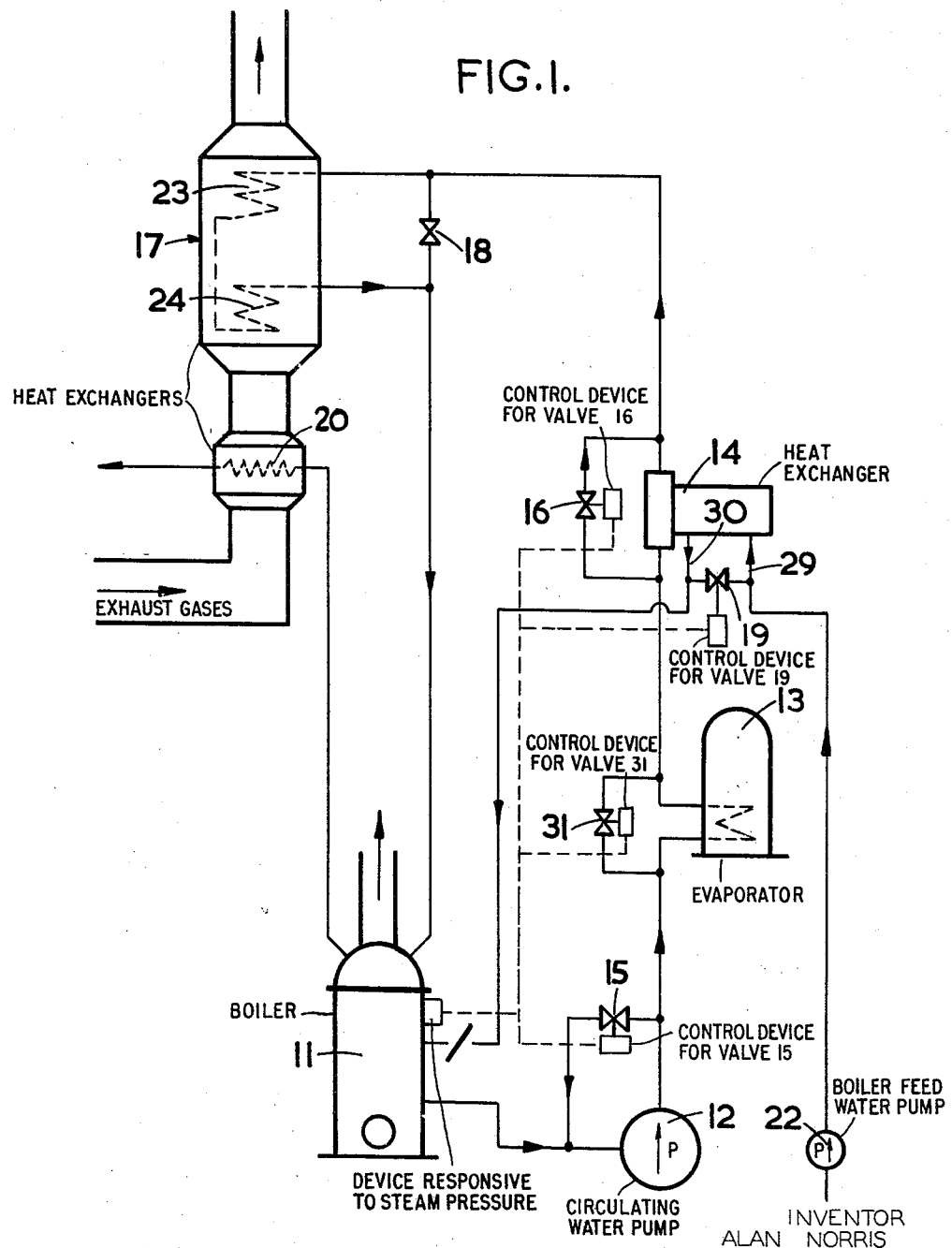

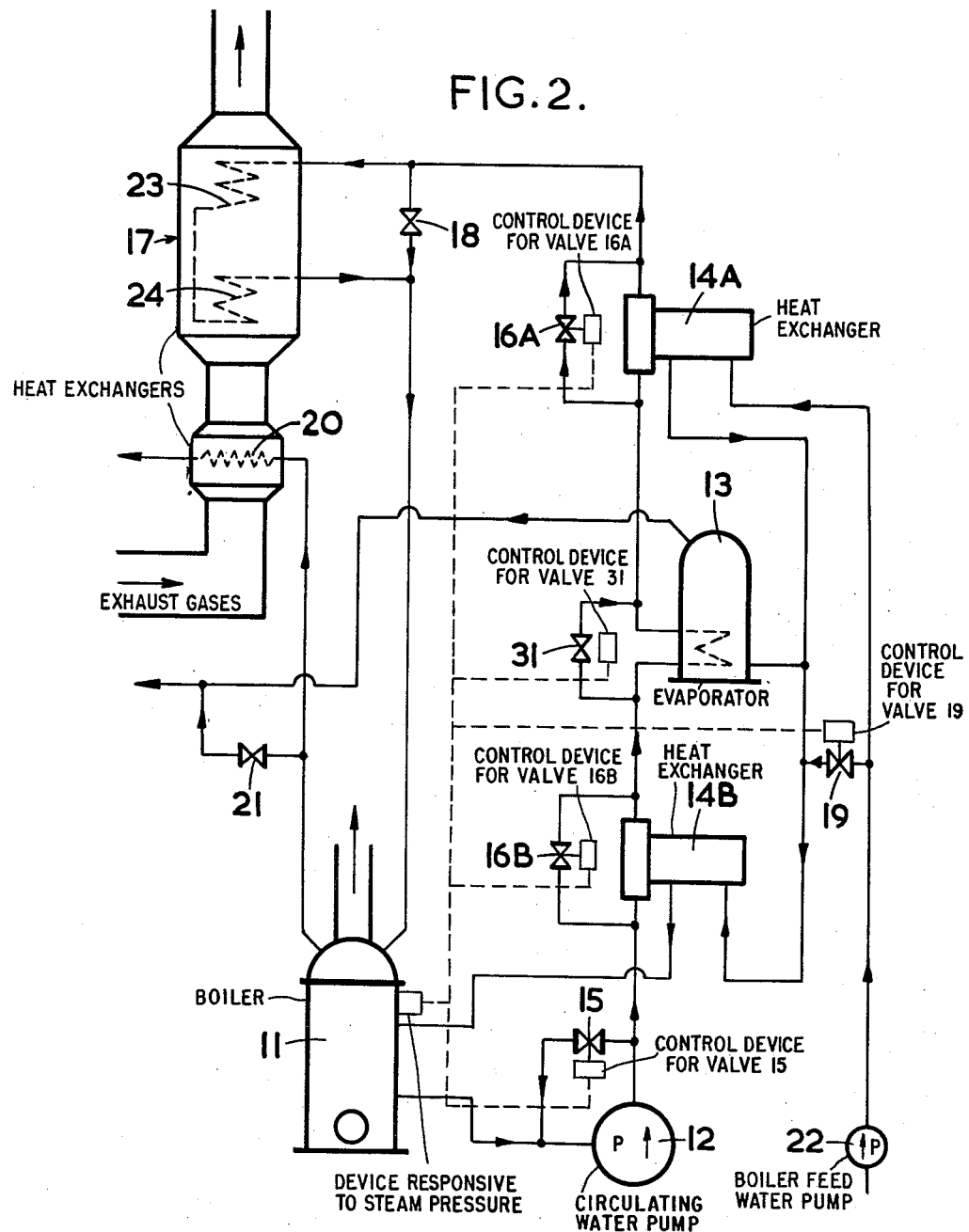

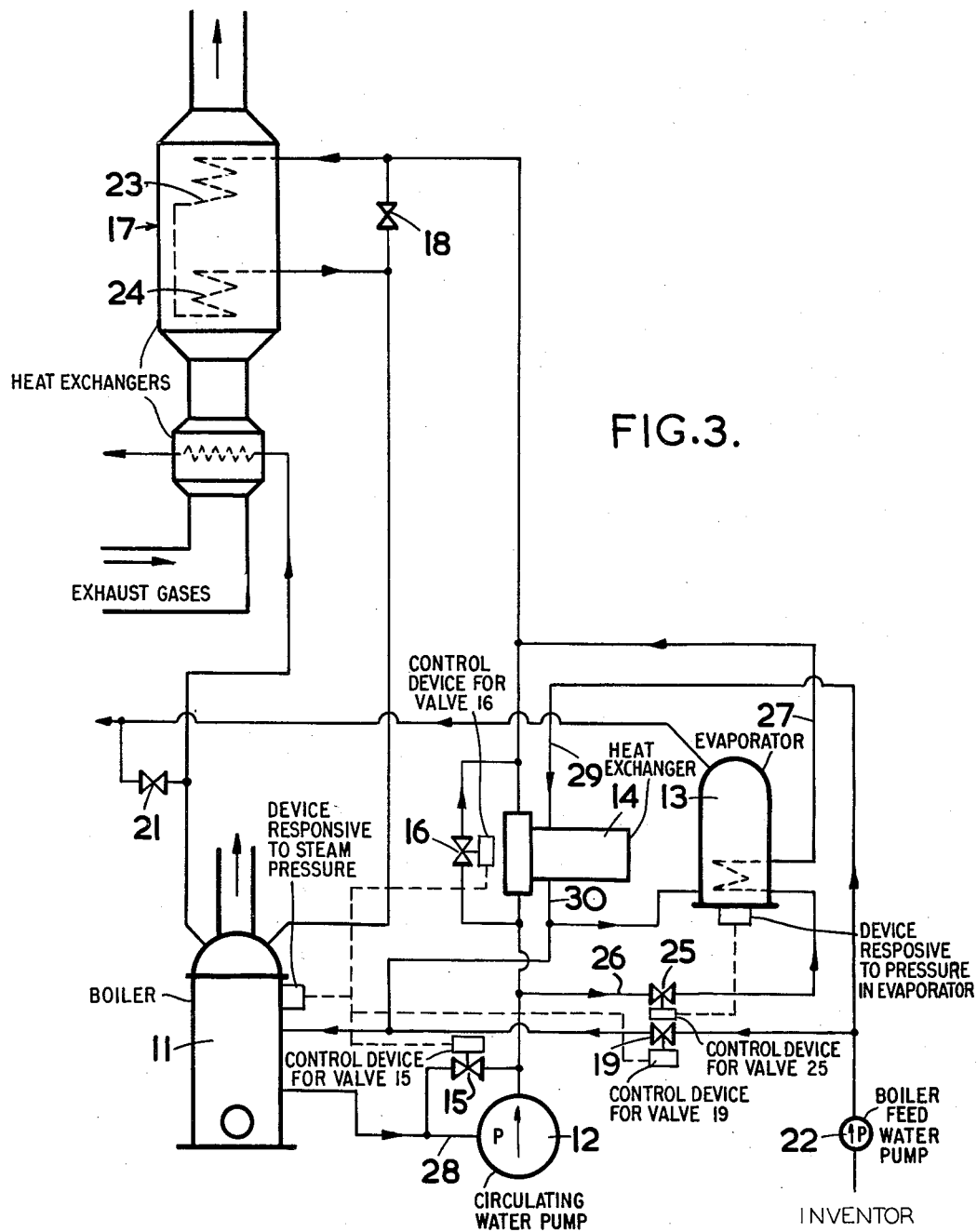

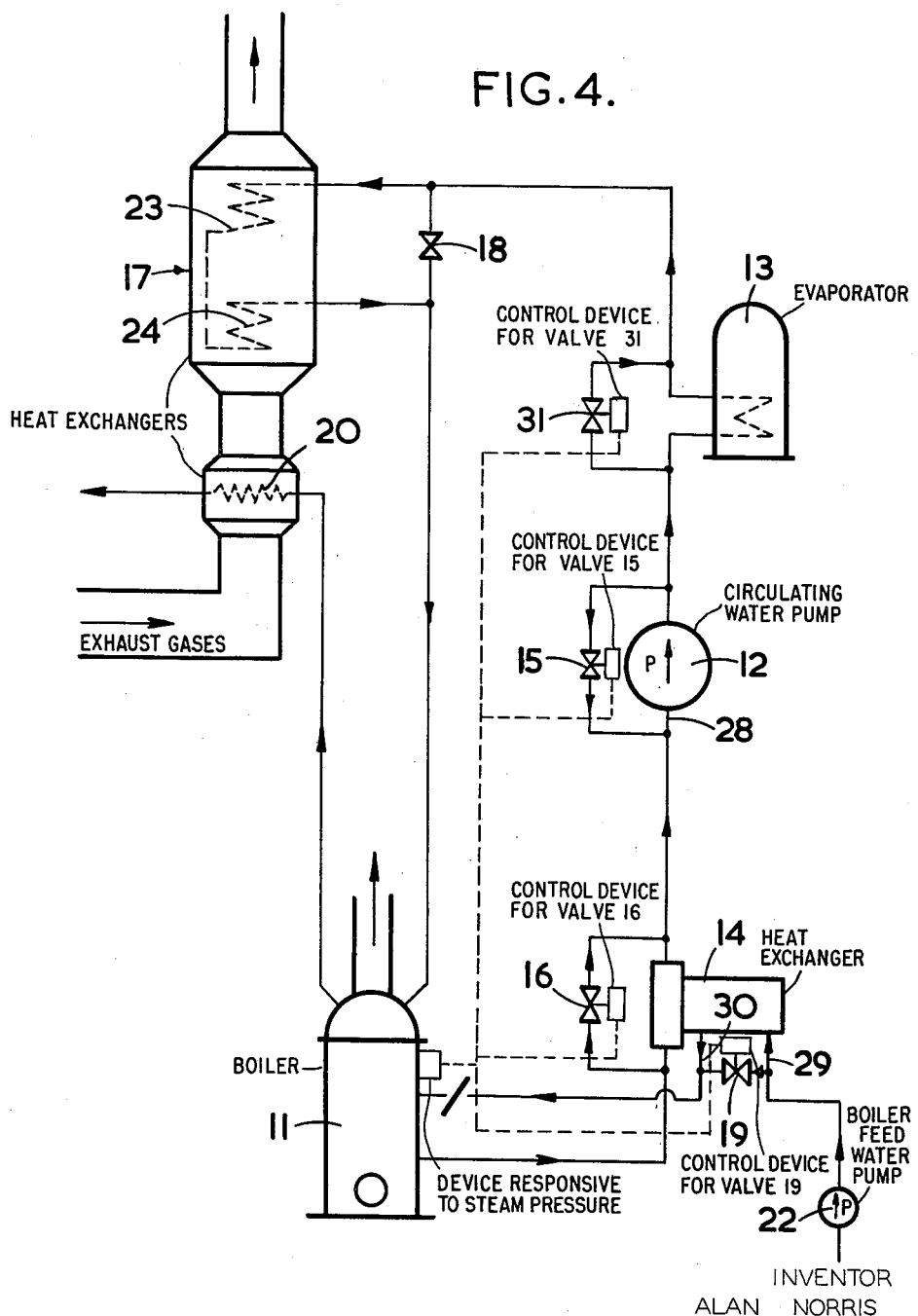

United States Patent Office 3,095,861
Patented July 2, 1963

3,095,861
METHOD AND APPARATUS FOR EXTRACTING HEAT FROM THE HOT EXHAUST GASES OF INTERNAL COMBUSTION ENGINES
Alan Norris, Britannic House, Finsbury Circus, London E.C. 2, England
Filed Nov. 9, 1959, Ser. No. 851,607
Claims priority, application Great Britain Nov. 10, 1958
8 Claims. (Cl. 122—7)

This invention relates to an improved method and apparatus for extracting heat from the hot exhaust gases produced by an internal combustion engine, including a gas turbine engine, particularly the exhaust gases produced by large diesel engines, e.g. marine diesel engines. The term "diesel engine" as used in this specification means an engine using a compression ignition cycle and includes free piston type engines.

With the increasing use of large diesel engines it is becoming more important to make maximum use of the heat in the exhaust gases, which is otherwise dissipated to the atmosphere. It is apparent that maximum utilisation of heat can only be obtained if the temperature of the exhaust gases leaving the system is reduced to the lowest level at which corrosion in the exhaust system is avoided. The heat removed from the exhaust gases can be used to generate steam which in its turn can be used for auxiliary power services and heating. An important auxiliary power service is electric power and this can be provided by a generator driven by a steam engine. The efficiency of a steam engine can be increased by using high pressure steam and it is therefore desirable that the heat in the exhaust gases be used to provide steam at high pressure. (By high pressure I mean pressures above atmospheric and preferably about 100–300 pounds per square inch.)

It is known to use the heat in diesel exhaust gases for the production of steam at atmospheric pressure. In one well known system water from a boiler is used to cool the exhaust gases by means of a heat-exchanger. If such a system operates at atmospheric pressure then the water from the boiler is at 212° F. and it is converted into steam also at 212° F. A typical exhaust temperature is 570° F.; thus heat is taken from gases at 570° F. by water at 212° F. Consider this simple system being used to produce steam at high pressure, e.g. 200 pounds per square inch. At this pressure the water will boil at 388° F. so that, by the use of this system the exhaust gases at 570° will be cooled by water at 388° F. It is possible to cool the exhaust to about 300° F. before the onset of corrosion. It is clearly impossible to do this by the use of water at 388° F. This system, therefore, cannot provide sufficient cooling when used to generate high pressure steam.

It is an object of the present invention to provide an improved method of and apparatus for using the heat contained in the exhaust gases produced by an internal combustion engine, e.g. a marine diesel engine, to produce high pressure steam more efficiently than hitherto.

According to the invention, there is provided a method of extracting heat from the hot exhaust gases produced by an internal combustion engine, of the type in which hot water from a boiler is passed into indirect heat exchange with the hot exhaust gases and returned to the boiler, in which the hot water from the boiler is cooled before being passed into heat exchange with the exhaust gases. Advantageously the hot water is cooled by indirect heat exchange with the boiler feed-water.

This method is particularly advantageous when used at elevated pressures, as for example 100–300 pounds per square inch.

The invention also comprises apparatus for extracting heat from the hot exhaust gases produced by an internal combustion engine, of the type in which hot water from a boiler is passed into indirect heat exchange with the hot exhaust gases and returned to the boiler, in which one or more means of cooling the water from the boiler before it is passed into indirect heat exchange with the hot exhaust gases are provided. When two or more means of cooling the hot water from the boiler are provided they may be connected in series or parallel or in any series/parallel arrangement.

(Hereinafter the hot water which is removed from the boiler, cooled, passed into indirect heat exchange with the exhaust gases and returned to the boiler will be called the "circulating water.")

In a preferred form of the invention one means of cooling the circulating water is by indirect heat-exchange with the boiler feed-water.

(This heat exchange is conveniently carried out by means of one or more heat exchangers. Hereinafter a heat exchanger in which heat is transferred from the circulating water to the boiler feed-water will be called a "boiler feed-heater.")

In a system working at super-atmospheric pressure the circulating water may be cooled in one or more water evaporators which may be used in addition to or instead of the boiler feed-heaters. A water evaporator comprises a shell containing water at a pressure below that in the boiler, and a heating coil placed in heat exchange relationship with the water in the shell. Each evaporator is connected so that the circulating water passes through its heating coil. When used in addition to boiler feed-heaters the heating coils may be connected either in series or parallel or any series/parallel arrangement with the boiler feed-heaters. If a water evaporator is in series with a boiler feed-heater it may be connected so that the circulating water passes through the heating coil of the evaporator either before or after it passes through the boiler feed-heater. In any cases, the evaporators must be connected so that the water which passes through their heating coils does so before it passes into indirect heat exchange with the hot exhaust gases. In an evaporator the circulating water is cooled and the water in the shell of the evaporator is heated and converted into steam at a pressure below that in the boiler. This steam may be used for heating purposes, such as heating of fuel oil tanks, crew quarters, heating distillation units for making fresh water from sea water, or for any other convenient purpose.

The apparatus may advantageously be designed to operate at pressures above atmospheric, as for example 100–300 pounds per square inch.

Means may be provided for controlling the rate of circulation of the circulating water in such a manner that the rate of flow is decreased when the pressure in the boiler rises. This means may take the form of a recirculating valve in parallel with a pump which circulates the circulating water. Advantageously this valve is automatically controlled by the pressure in the boiler in such a manner that recirculation commences and increases as the pressure in the boiler rises above a preset level.

One or more bypass valves, which may be automatically controlled by the pressure in the boiler, may be connected in parallel with some or all of the means for cooling the circulating water. The control of these valves is so arranged that the valves open, either simultaneously or, preferably, in sequence, as the pressure in the boiler rises above the desired working pressure. Thus a high pressure in the boiler causes less circulating water to pass through at least some of the cooling means and in particular it may cause less circulating water to pass through one or more of the boiler feed-heaters. Reduction in the quantity of circulating water passed into heat exchange with the boiler feed-water reduces the quantity of heat exchanged between the boiler feed-water and the circulating water. This produces two results:

(1) The temperature of the boiler feed-water leaving the boiler feed-heaters is reduced so that the amount of heat entering the boiler in the boiler feed-water is reduced.

(2) The temperature of the circulating water leaving the boiler feed-heaters is increased; that is the temperature of the circulating water entering into indirect heat exchange with the exhaust gases is increased. Thus there will be less heat removed from the exhaust gases and added to the circulating water; that is the gain in heat content of the circulating water during heat exchange with the exhaust gases will decrease when the initial temperature of the circulating water is increased even though the total heat content of the circulating water may be slightly increased. (The circulating water is partly vaporised during the heat exchange under discussion; the word "water" is therefore intended to apply to both liquid and vapour phases.)

Thus the total effect produced by opening a bypass valve in parallel with the cooling means is to reduce the total amount of heat entering the boiler in the boiler feed-water and in the circulating water; bypass valves can, therefore, be used to control the pressure in the boiler.

The same effect can be obtained by fitting automatically controlled bypass valves so that the boiler feed-water can bypass the boiler feed-heaters. In both arrangements the effect of opening some or all of the bypass valves is that the circulating water and the boiler feed-water are partially removed from heat exchange relationship so controlling the pressure in the boiler as described above. Advantages could be obtained by fitting bypass valves in the boiler feed-water circuit rather than in the circulating water circuit as there is less water flowing in the boiler feed-water circuit and that water is at a lower temperature than the circulating water. Bypass valves may be fitted in both circulating water and boiler feed-water circuits if desired.

Superheated steam may be obtained if desired by subjecting high pressure steam from the boiler to indirect heat exchange with the exhaust gases. When superheated steam is to be produced in this way, the indirect heat exchange between the steam from the boiler and the exhaust gases should be the first heat exchange to which the exhaust gases are subjected after they leave the engine.

The invention will now be described by way of example with reference to accompanying drawings in which:

FIGURE 1 illustrates diagrammatically a system for extracting heat from hot exhaust gases in accordance with the invention and, FIGURES 2–4 illustrate diagrammatically various modified systems.

Reference will first be made to FIGURE 1.

Circulating water is taken from the water space of a boiler 11, which may also be fired by external means. This water is discharged by a circulating pump 12 to a boiler feed-heater 14, where its temperature is reduced by indirect heat exchange with boiler feed-water which enters by line 29 and leaves by line 30. The boiler feed-water is pumped into the boiler 11 by the boiler feed-pump 22 via the boiler feed-heater 14. On leaving the boiler feed-heater 14 the circulating water is passed into heat-exchanger 17 through which the exhaust gases produced by an internal combustion engine also pass in indirect heat exchange with the circulating water. Contraflow of exhaust gases and circulating water is arranged in at least part of heat-exchanger 17. As contraflow is more difficult to arrange than parallel flow a convenient arrangement only uses contraflow for the initial heating of the circulating water (which is preferably the final cooling of the exhaust gases), and uses parallel flow for the final heating of the circulating water (which is preferably the initial cooling of the exhaust gases). In the drawings that part of heat-exchanger 17 in which contraflow takes place is indicated by the reference numeral 23 and that part in which parallel flow takes place is indicated by the reference numeral 24.

During the passage through the heat-exchanger 17 the circulating water gains heat from the exhaust gases. Thus the temperature of the circulating water is raised and some of it is converted into steam. The mixture of water and steam is returned to the steam space of boiler 11.

When it is desired to produce superheated steam, steam from boiler 11 may be passed through heat-exchanger 20. The hot exhaust gases produced by the internal combustion engine pass through the heat-exchanger 20 before they pass through the heat-exchanger 17.

The rate of circulation of the circulating water is controlled by a recirculation valve 15 connected between the circulating pump 12 discharge and suction sides. The valve 15 is automatically controlled by the pressure in the boiler 11 in such a manner that an increase of pressure above a preset level causes the valve to open, thereby reducing the quantity of circulating water circulated through the system. The pressure in the boiler 11 will rise if steam production exceeds steam demand so that the function of valve 15 is to reduce the quantity of water circulated into heat-exchanger 17 when the quantity of steam being used is reduced.

The system is self-balancing as reduction in steam demand will result in a smaller amount of condensate being formed and returned to the boiler by the boiler feed pump, hence the heat extracted from the circulating water in boiler feed-heater 14 will be less. The temperature of the circulating water entering the heat-exchanger 17 will be higher than formerly and the heat transfer rate across the surfaces will be reduced. The net effect is to reduce steam output. A similar control can be exerted by means of a bypass valve 16 fitted between the circulating water inlet and outlet branches of boiler feed-heater 14, or by means of a bypass valve 19 fitted between the boiler feed-water inlet and outlet branches of the boiler feed-heater 14. These valves are automatically adjusted according to the steam pressure in the boiler so that increasing pressure in the boiler causes increasing quantities of circulating water (in the case of bypass valve 16) and boiler feed-water (in the case of bypass valve 19) to bypass the boiler feed-heater 14. There is, therefore, less heat exchanged between the boiler feed-water and the circulating water so that the temperature of circulating water leaving boiler feed-heater 14 increases and the temperature of the boiler feed-water leaving boiler feed-heater 14 decreases. The hotter circulating water extracts less heat from the exhaust gases; the colder boiler feed-water causes a reduction in the steam pressure in the boiler.

In order to obtain the maximum quantity of heat from the exhaust gases it may be desirable to arrange contraflow of circulating water and exhaust gases throughout heat-exchanger 17. The arrangement of contraflow is made more difficult by the presence of steam in the circulating water circuit. It may, therefore, be desirable to avoid the formation of steam in the heat-exchanger 17, and this may be done by increasing the pressure of the circulating water in heat-exchanger 17. If this arrangement is adopted then the pressure of the circulating water must be reduced after it leaves heat-exchanger 17 so that at least a portion of the circulating water will be converted into steam. The reduction in pressure is conveniently carried out by passing the circulating water through a pressure reducing device such as an orifice plate before it enters the boiler 11. As the pressure in the boiler is necessarily below that of the circulating water in heat-exchanger 17 the pressure of the circulating water must be increased before it enters heat-exchanger 17. This increase may conveniently be achieved by means of the circulating pump 12.

As well as for providing high pressure steam which can be used to generate electric power, the invention may also be used to provide heat and power for other auxiliary power services. Examples of heat requirements of an oil tanker are the heating of fuel oil; the heating of heavy cargo oils, and the distillation of sea water. Heat may be taken from the system for any purpose provided that, directly or indirectly, it is removed from the circulating water. Taking heat from the circulating water reduces its temperature on entering the heat-exchanger 17 so that more heat is removed from the exhaust gases.

Direct extraction of heat from the circulating water may be achieved by passing the circulating water through the heating coil of the evaporator 13. The evaporator may be connected in series with the boiler feed-heater, either before it, as shown, or after it, or the water evaporator may be connected in parallel with the boiler feed-heater. The heating coil is placed in heat exchange relationship with water contained in the shell of the evaporator which is turned into steam at a pressure which is lower than that in the boiler 11. This steam may be required for various engines and heating purposes, as for example fuel oil heating. If desired the heat extracted from the circulating water in water evaporator 13 may be controlled by means of a bypass valve 31. This valve is operated in the same way as bypass valve 16 and serves an analogous purpose.

Low pressure steam can also be obtained from the hot water in the boiler 11 or from the hot water in the circulating system by taking out hot water via a pressure reducing device such as a flash evaporator; the low pressure steam and water can be used as desired but they will lose heat in use before they are returned to the boiler via the boiler feed pump 22 and boiler feed-heater 14. On passing through boiler feed-heater 14 the heat lost during use will be replaced from the circulating water.

Thus the heat lost by the steam or water in use has been taken indirectly from the circulating water which can therefore extract a similar quantity of heat from the exhaust gases.

The waste heat in the exhaust gases of a large marine diesel engine is normally sufficient to provide energy for all the ship's auxiliary power services for a large part of the time. However, there may be insufficient heat in the gases to supply peak load; also no power can be obtained from the exhaust gases while the main engines are stopped. It is therefore necessary that the boiler be provided with a means of heating independent of the main engines such as, for example oil firing. A bypass valve 18 may be provided to permit the circulating water to bypass heat-exchanger 17 when the main engines are not in use.

FIGURE 2 illustrates diagrammatically a circuit in accordance with this invention in which a portion of the boiler feed-water is vaporised by indirect heat exchange with the circulating water and used as low pressure steam. In this particular modification of the invention water from a boiler 11 is circulated, in order, to a first boiler feed-heater 14B, the heating coil of a water evaporator 13, a second boiler feed-heater 14A and returned to the boiler 11 via heat-exchanger 17. The circulating water is circulated by means of circulating pump 12. A recirculation valve 15 is connected in parallel with the circulating pump to control the flow of circulating water as described with reference to FIGURE 1. The boiler feed-water is first passed to boiler feed-heater 14A where a preliminary heating takes place. On leaving boiler feed-heater 14A the boiler feed-water splits into two streams. One stream is fed to the shell of the water evaporator 13 where it is vaporised and turned into low pressure steam. The other stream is fed to the boiler 11 via boiler feed-heater 14B. A bypass valve 19, which operates as described with references to FIGURE 1, is connected so as to enable the boiler feed-water to go direct to the boiler feed-heater 14B. Thus the opening of bypass valve 19 causes less of the boiler feed-water to pass into boiler feed-heater 14A whereby less heat is extracted from the circulating water. (Alternatively the bypass valve 19 may be connected so as to enable a portion of the boiler feed-water to enter the boiler 11 without passing through either of boiler feed-heaters 14A or 14B.)

Low pressure steam may also be obtained by passing high pressure steam from the boiler 11 through a pressure reducing valve 21. This low pressure steam may be used to augment the low pressure steam produced by the water evaporator 13.

Superheated high pressure steam can be obtained as described with reference to FIGURE 1 by passing high pressure steam from the boiler 11 through heat-exchanger 20.

The operation of this circuit is as described with reference to FIGURE 1; corresponding parts of both circuits have the same reference numeral.

FIGURE 3 illustrates diagrammatically a modification of the circuit illustrated in FIGURE 2 in which the circulating water flows in parallel through a single boiler feed-heater 14 and a water evaporator 13 and some of the boiler feed-water, after being heated in boiler feed-heater 14, is converted to low pressure steam in water evaporator 13. A bypass valve 19, controlled as described with reference to FIGURE 1, is fitted so as to permit a portion of the boiler feed-water to enter the boiler 11 and the water evaporator 13 without being heated in boiler feed-heater 14.

In this or any other parallel arrangement the flow of circulating water through the water evaporator 13 may be controlled by means of a valve 25, situated either in line 26 (as shown) or in line 27 and controlled by the pressure in the shell of the water evaporator 13. The automatic control of the valve 25 is so arranged that the flow of circulating water through the water evaporator 13 is reduced as the pressure in its shell rises above a preset level. The valve 25 limits the flow of circulating water to, and hence the heat input of, water evaporator 13 to requirements. As the water evaporator 13 is connected in parallel with the boiler feed-heater 14 a reduction in flow through one causes an increase in the flow through the other. Thus valve 25 provides that a decrease in the heat demand of water evaporator 13 increase the flow of circulating water to, and hence the heat input to, boiler feed-heater 14 so improving the heat balance of the system.

FIGURE 4 illustrates diagrammatically a circuit similar to that of FIGURE 1 except that the circulating water is cooled in boiler feed-heater 14 before it passes through circulating pump 12.

According to this modification the circulating water is subjected to some cooling before it reaches circulating pump 12. This offers advantages in pump design and operation, and the reduction of temperature of the circulating water on the suction side of circulating pump 12 prevents vapour formation in the line 28 or in the circulating pump 12 when the pressure is reduced by frictional losses.

It is desirable that provision should be made for servicing any of the component parts of a circuit according to this invention without closing down the whole system. This provision may be made by fitting bypass valves in parallel with, and stop valves in the inlet and outlet lines of, all the component parts of the circuit.

I claim:

1. Apparatus for extracting heat from the hot exhaust gases produced by an internal combustion engine comprising:

a boiler having means for removing steam at a high temperature therefrom;

cooling means having indirect heat exchange means for transferring useful heat from one fluid to another;

a heat exchanger including means for forwarding hot exhaust gases therethrough and means for forwarding water therethrough in indirect heat exchange relationship with said exhaust gases so that the heat content of said water is increased;

conduits connecting said boiler, said cooling means and said heat exchanger to provide a closed circuit for circulating water from said boiler through said circuit with said water passing through said cooling means before it passes through said heat exchanger so that heat is transferred from said water to another fluid in said cooling means;

means for continuously circulating water through said closed circuit;

a bypass circuit connected in parallel with said cooling means and valve means in said bypass circuit for controlling the amount of water circulating through said bypass circuit whereby the amount of cooling of the circulating water by said cooling means can be controlled.

2. Apparatus according to claim 1, in which said cooling means includes a boiler feed-heater including means for passing boiler feed water in indirect heat exchange with the circulating water and then passing said boiler feed water into said boiler, said bypass circuit being connected in the boiler feed-water and in parallel with the boiler feed-heater, said bypass circuit containing a valve, control means for said valve, said control means being responsive to the pressure in the boiler and being connected to the valve so that the setting of the valve is automatically controlled by the pressure in the boiler in such a manner that its opening commences and increases as the pressure in the boiler rises above a preset level.

3. Apparatus according to claim 1, in which said cooling means includes a low pressure boiler including means for passing water from an external supply in indirect heat exchange with the circulating water and supplying steam generated in said low pressure boiler to an external apparatus.

4. A method of extracting heat from the hot exhaust gases of an internal combustion engine which comprises continuously circulating water through a closed circuit which includes a boiler, continuously operating cooling means for receiving circulating water from the boiler, a bypass circuit in parallel with said cooling means for by-passing water around said cooling means and an exhaust gas heat exchanger for receiving water from said cooling means and heating the water by indirect heat exchange with the exhaust gases in a single continuous process to produce a stream-water emulsion which is returned to the boiler; withdrawing steam from the boiler at a relatively high temperature and supplying it to devices requiring high temperature steam supplies, the water circulated through the circuit being withdrawn from the boiler at the same temperature as the high temperature steam and the weight of water circulated through the circuit being adjusted to meet the balance of useful heat supply requirements of the entire circuit and to maintain safe temperature levels in the circuit, the cooling means extracting heat from the circulating water and transferring it to other systems external to the circuit which systems operate at a lower temperature than that in the boiler, passing a selectable quantity of water through the bypass circuit in order to control the amount of heat extracted from the circulating water by the cooling means, the cooled circulating water at the correct controlled temperature for the protection of the heat exchanger being passed in indirect heat-exchange relationship with the exhaust gases to extract heat therefrom and thereby increase the heat content of the water before returning same to the boiler.

5. A method according to claim 4, in which the rate of flow of water through the bypass circuit is controlled by a valve and including the further step of automatically controlling the valve in response to the pressure in the boiler in such a manner that the flow of water through the bypass circuit commences and increases as the pressure in the boiler rises above a selected preset level.

6. A method according to claim 4, in which the circulating water while in a liquid state is subjected to indirect heat exchange with water in a low pressure boiler operating at a superatmospheric pressure, in such a manner that the water is converted into steam of lower pressure than said high pressure steam from said first named boiler and the circulating water is cooled, the steam generated in said low pressure boiler being supplied to an external apparatus, the circulating water being the sole heat supply to said low pressure boiler.

7. A method according to claim 4, in which the circulating water is cooled by indirect heat exchange with the boiler feed-water in at least one boiler feed-heater, the boiler feed-water being heated to a temperature close to the temperature of the boiler to maintain the rate of such steam formation at a high level.

8. A method according to claim 7, in which there is a bypass circuit around the boiler feed-heater and the rate of flow of water through the boiler feed-heater bypass circuit is controlled by a valve and including the further step of automatically controlling the valve in response to the pressure in the boiler in such a manner that the flow of water through the boiler feed-heater bypass circuit commences and increases as the pressure in the boiler rises above a level preset for that valve.

References Cited in the file of this patent

UNITED STATES PATENTS

| | | |
|---|---|---|
| 1,552,661 | Apple | Sept. 8, 1925 |
| 1,768,448 | Hartmann et al. | June 24, 1930 |
| 2,266,193 | Grutzner | Dec. 16, 1941 |
| 2,823,650 | Hedback et al. | Feb. 18, 1958 |
| 2,893,926 | Worthen et al. | July 7, 1959 |
| 2,908,632 | Rowand | Oct. 13, 1959 |

FOREIGN PATENTS

| | | |
|---|---|---|
| 392,219 | Great Britain | May 15, 1933 |
| 802,189 | France | Apr. 29, 1936 |